United States Patent [19]

Dimiter

[11] 4,287,252

[45] Sep. 1, 1981

[54] RECONSTITUTED LEATHER AND METHOD OF MANUFACTURE

[76] Inventor: Serge Dimiter, Box 341, Poughkeepsie, N.Y. 12602

[21] Appl. No.: 184,656

[22] Filed: Sep. 5, 1980

Related U.S. Application Data

[63] Continuation-in-part of Ser. No. 80,049, Sep. 28, 1979, abandoned, which is a continuation of Ser. No. 919,474, Jun. 27, 1978, abandoned.

[51] Int. Cl.$^3$ .................... C08L 89/06; B32B 3/26; B32B 9/02; B32B 5/18
[52] U.S. Cl. .................... 428/316; 428/307; 428/407; 428/904; 106/156; 260/6; 260/8; 156/62.2; 156/154; 264/122; 264/117; 264/126; 264/128; 264/176 R
[58] Field of Search .............. 428/307, 316, 407, 904, 428/540; 162/151; 156/154, 62.2; 264/117, 122, 126, 128, 176 R; 106/156; 260/6, 8

[56] References Cited

U.S. PATENT DOCUMENTS

| | | | |
|---|---|---|---|
| 2,112,517 | 3/1938 | Cable | 162/151 X |
| 3,116,200 | 12/1963 | Young et al. | 162/151 |
| 3,574,021 | 4/1971 | Van Buskirk | 428/320 X |
| 3,616,169 | 10/1971 | Okamura | 162/151 X |
| 3,756,909 | 9/1973 | Stephan et al. | 162/151 |
| 3,984,597 | 10/1976 | Haack et al. | 428/904 X |
| 4,011,130 | 3/1977 | Worden | 162/151 |

*Primary Examiner*—George F. Lesmes
*Assistant Examiner*—Alexander S. Thomas
*Attorney, Agent, or Firm*—Eugene E. Geoffrey, Jr.

[57] ABSTRACT

A reconstituted leather and method of manufacture wherein leather is pulverized to form a fine powder which is then treated to polarize the particles and cause them to form groups or aggregates. The aggregates are then intermixed with a resinous binder to form said reconstituted leather which is then buffed to expose the natural leather and produce a structure closely resembling natural leather in feel, odor and appearance.

14 Claims, No Drawings

RECONSTITUTED LEATHER AND METHOD OF MANUFACTURE

This application is a continuation-in-part of application Ser. No. 080,049, filed Sept. 28, 1979, now abandoned, which is a continuation of application Ser. No. 919,474, filed June 27, 1978, now abandoned.

This invention relates to reconstituted leather and more specifically to a novel and improved leather product and method of manufacture.

The reconstitution of leather such as scraps and the like in order to place them in a usable form is well known. Essentially, all known efforts have involved a reduction of the fibers into a sheet which would resemble a hide. Synthetic fibers such as organic fibers have also been used to produce man-made polymeric leather. To form the leather fibers into a sheet material, they were incorporated in a slurry containing a resinous binder, whereupon the slurry is felted to form a mat which is then pressed to produce the resultant product. When forming sheet materials of leather fibers, which also may include synthetic fibers, the resultant structure is generally impervious to air and the resultant structure resembles more the texture of plastic sheeting.

One example of a prior method and product utilizing leather fibers is disclosed in U.S. Pat. No. 3,116,200 to Harland H. Young. Plasticizers, which are disclosed in the Young patent, are not particularly desirable in as much as they can be leached out by contact with oil or soapy water and can be easily rubbed off by contact with clothing, upholstery and the like. Moreover when used in areas subjected to high heat such as automobile interiors, the plasticizers will evaporate into the air and will not only result in material fogging of the windows but will be inhaled by the occupants.

Products heretofore suggested have not been found satisfactory as a practical substitute for leather since aside from the undesirable odor and feel they do not have leather or leatherlike characteristics.

Another difficulty heretofore encountered in the formation of a reconstituted leather product, leathers tanned by specific processes must be used in order to produce a satisfactory product, for example, tanning processes using chrome, alum, zinconium and iron. Other processes have suggested the need for removing chromic salts used in tanning and special washing techniques have also been suggested.

This invention overcomes the foregoing difficulties and provides a novel and improved reconstituted leather product and method of manufacture which does not require the use of leather tanned in a specific manner and provides a resultant product closely simulating natural leather in feel, odor and finish.

Another object of the invention resides in the provision of a novel and improved elastomerization process involving the conversion of leather into fine comminuted particles, forming the particles into groups and then combining the groups of particles with a binding material and without material impregnation thereof.

Still another object of the invention resides in the provision of a novel and improved reconstituted leather product having high impact strength even at low temperatures, high resistance to cracking, good thermal stability and relatively low cost.

The invention involves the formation of a reconstituted leather product by pulverizing the leather to produce a fine particulate consistency, polarizing the particles to create groups of particles and then binding the groups together with a resin binder such as an ethylene copolymer to form the groups of particles into a sheet or other desired form.

The above and other objects and advantages of the invention will become more apparent from the following description.

As pointed out above, the invention can be carried out with any type of leather whether organically or inorganically tanned and whether or not it may contain salts resulting from the tanning process.

The leather to be reconstituted is first pulverized to produce a particulate material wherein the particles are preferably of the order of 35 to 100 mesh or smaller. The particles are then polarized by subjecting them to electric charges or a mist formed of a highly polar solvent such as esters or ketones. Thereafter, the polarized particles will statically adhere one to another to form groups of particles. The groups of particles are intermixed with a heated resin binder in the proportion of about 15% to 25% binder and about 75% to 85% particles. The preferred proportion is about 25% of the binder to about 75% of the polarized particles.

The binder may be any suitable resinous material though binders such as ethylene vinylacetate copolymer, acrylate copolymer or acetoxylated polyethylene all of which have a carbon to carbon bond on which the acetoxy groups are attached with less frequency than in polyvinyl acetate have been found effective. One particularly useful resin is an ethylene vinylacetate copolymer having 21% to 29% vinylacetate, a melt index of 10.8 to 20 gram/10 min. and a density of 0.941 g/cc to 0.949 g/cc.

The polarity of the ethylene vinylacetate copolymer molecule gained from the acetoxy groups provide polar substrates, as well as binding capacity. Fundamentally, the introduction of these polar side chains into basic polyethylene structure reduces the crystallinity of the polymer, and consequently the stiffness modulus decreases.

The following advantages are attained with this invention:

1. Flexibility of a wide temperature range, including better low temperature flexibility than comparable man-made polymeric leather having the same room temperature stiffness moduls.
2. Flexibility without mixing a plasticizer into the polymeric material and, accordingly, no plasticizer problems are encountered such as migration, fogging out or vaporizing.
3. Very high impact strength even at extremely low temperatures.
4. High resistance to flex cracking or environmental stress cracking.
5. good thermal stability.
6. F.D.A. approvals at all comonomer levels.
7. Dielectric sealability.
8. Permeability.
9. Low price.

The following examples suggest preferred methods of manufacture in accordance with the invention:

EXAMPLE I

The first example of the method used and the end product produced, on the basis of a total weight of 100 grams, involves the use as a binder of about 25% of an ethylene vinylacetate copolymer and about 75% of polarized aggregates of powdered leather pretreated to polarize the particles and form aggregates.

The binder is melted in a vessel at about a temperature of 325°–350° F. with the help of a two-roll mill or Bambury mixer. At this stage, the melt has a liquid consistency. The melt is then added to the above pretreated powder aggregates in the proportions described above. Pretreatment as previously discussed consists of polarizing the powdered leather particles by a mist forming apparatus using a polarizing agent or by subjecting them to an electric charge.

After mixing, the resultant composition, at said temperature, is introduced into an extruder, mold or calender which is also preheated to the same temperature for sheet forming purposes. Following the molding, calendering or extrusion, the product sets upon attaining room temperature. Thus, the web or formed sheet, in roll or other form, is buffed on both sides to expose the natural leather particles. Thereafter, the sheet is ready for use as a basic material for commercial purposes.

EXAMPLE II

Example II follows the same procedure as Example I except that the resultant composition is reduced to pellets for further forming operations.

EXAMPLE III

Example III relates to a cellular product and is formed from pellets produced as by Example II, and the use of a blowing agent. Thus, about 98%–98½% of the said pellets and the balance of about 1½% to 2% of a blowing agent are used in formation of a cellular product or composition. Various types of blowing or expanding agents may be used such as azodicarbamide (for nitrogen generation), fluorinated hydrocarbons, freon, isocyanide and water (for carbon dioxide generation) and the like.

The pellets and the blowing agent are maintained in separate vessels and are added to the hopper of an extruder which is maintained at about 300° F. Upon extrusion, a cellular product is obtained and the surface skins are buffed for skin removal, as in Example I.

In the various embodiments of the invention discussed above, the selected resin may be in the form of a micronized powder mixed with the groups of polarized particles. The mixture is then heated and formed in the manner previously discussed.

While only certain embodiments of the invention have been described, it is understood that alterations, changes and modifications may be made without departing from the spirit and scope thereof.

What is claimed is:

1. A reconstituted leather product comprising pulverized leather particles polarized to form aggregates or groups of particles, said aggregates being at least partially encapsulated and bonded one to the others by a resin binder to form a sheet material, said sheet material having buffed surfaces and forming a structure closely simulating natural leather in feel, odor and appearance.

2. A reconstituted leather product as set forth in claim 1 wherein the binder is an ethylene vinylacetate copolymer.

3. A reconstituted leather product according to claim 2 wherein said binder includes 21% to 29% of vinylacetate having a melt index of 10.8–20 gram/10 min. and a density of 0.941 g/cc to 0.949 g/cc.

4. A reconstituted leather product as set forth in claim 1 wherein said structure includes a plurality of air cells distributed throughout.

5. A reconstituted leather product as set forth in claim 1 wherein the binder is thermoplastic.

6. The method of making a reconstituted leather composition comprising the steps of pulverizing leather to form fine particles, polarizing said particles to cause them to adhere to form groups of particles or aggregates, binding said aggregates by a resinous binder to form said reconstituted leather and then buffing the surfaces thereof to expose the natural leather particles.

7. The method according to claim 6 wherein said binder is an ethylene vinylacetate copolymer.

8. The method according to claim 7 wherein said binder includes 21% to 29% of vinylacetate having a melt index of 10.8–20 gram/10 min. and a density of 0.941 g/cc to 0.949 g/cc.

9. The method according to claim 6 wherein said resinous binder is an ethylene acrylate copolymer.

10. The method according to claim 6 including the steps of melting said binder and intermixing said binder with said aggregates.

11. The method according to claim 6 wherein said particles and binder are mixed in the proportion of 75% to 85% particles and 15% to 25% binder by volume.

12. The method according to claim 6 wherein said particles and binder are mixed in the proportion of 75% particles and 25% binder by weight.

13. The method according to claim 6 wherein said resinous binder is in the form of micronized powder, said powder is intermixed with said aggregates and the mixture is heated and formed under pressure to form said reconstituted leather.

14. The method according to claim 6 including the step of extruding the heated mixture of said binder and said aggregates to produce said reconstituted leather in sheet form.

* * * * *